United States Patent
Pöyhönen et al.

(10) Patent No.: US 8,090,858 B2
(45) Date of Patent: Jan. 3, 2012

(54) SYSTEMS AND METHODS FOR ENCAPSULATION BASED SESSION INITIATION PROTOCOL THROUGH NETWORK ADDRESS TRANSLATION

(75) Inventors: Petteri Pöyhönen, Helsinki (FI); Ritva Siren, Helsinki (FI)

(73) Assignee: Nokia Siemens Networks OY, Espoo (FI)

( * ) Notice: Subject to any disclaimer, the term of this patent is extended or adjusted under 35 U.S.C. 154(b) by 1184 days.

(21) Appl. No.: 10/898,726

(22) Filed: Jul. 23, 2004

(65) Prior Publication Data
US 2006/0078096 A1  Apr. 13, 2006

(51) Int. Cl.
*G06F 15/16* (2006.01)
(52) U.S. Cl. ........ 709/230; 709/240; 709/245; 709/246; 370/349
(58) Field of Classification Search .......... 709/245, 709/230, 240, 227, 246; 370/349
See application file for complete search history.

(56) References Cited

U.S. PATENT DOCUMENTS

| | | | |
|---|---|---|---|
| 2002/0042875 A1 | 4/2002 | Shukla | |
| 2002/0044567 A1* | 4/2002 | Voit et al. | 370/467 |
| 2002/0077136 A1* | 6/2002 | Maggenti et al. | 455/518 |
| 2002/0112073 A1* | 8/2002 | MeLampy et al. | 709/240 |
| 2002/0141384 A1 | 10/2002 | Liu et al. | |
| 2003/0043992 A1* | 3/2003 | Wengrovitz | 379/229 |
| 2003/0063623 A1 | 4/2003 | Leslie et al. | |
| 2003/0093563 A1* | 5/2003 | Young et al. | 709/245 |
| 2003/0112793 A1 | 6/2003 | Sengodan | |
| 2003/0137961 A1* | 7/2003 | Tsirtsis et al. | 370/338 |
| 2003/0154244 A1 | 8/2003 | Zellers et al. | |
| 2003/0188001 A1 | 10/2003 | Eisenberg et al. | |
| 2004/0054723 A1 | 3/2004 | Dayal et al. | |
| 2004/0097188 A1* | 5/2004 | Tanimoto | 455/3.06 |
| 2004/0105420 A1* | 6/2004 | Takeda et al. | 370/349 |
| 2004/0186918 A1* | 9/2004 | Lonnfors et al. | 709/250 |
| 2004/0221042 A1* | 11/2004 | Meier | 709/227 |

FOREIGN PATENT DOCUMENTS
WO   WO 2005033971   4/2005

OTHER PUBLICATIONS

*Traversing Firewalls and NATs with Voice and Video Over IP*; Wainhouse Research, Apr. 2002, pp. 1-11.
*SIP, NAT, and Firewalls*, Master's Thesis, F. Themelius, Department of Teleinformatics, Ericsson, May 2000, 69 pages.
*SIP: Protocol Overview*, Radvision Ltd., 2001, 16 pages.
*Solving the Firewall and NAT Traversal Issues for Multimedia over IP Services*, Newport Networks, 2004, 14 pages.
*Session Initiation Protocol (SIP)—Specific Event Notification*, RFC 3265, A. B. Roach, Dynamicsoft, Jun. 2002, 38 pages.
*SIP Through NAT Enabled Firewall Call Flows*, C. Martin et al., WorldCom, Feb. 2001, 28 pages.
*Getting SIP through Firewalls and NATs*, J. Rosenberg et al., Dynamicsoft, Columbia University, Feb. 2000, 25 pages.
*H.323 and Firewalls: Problem Statement and Solution Framework*, M. Shore, Nokia, Feb. 2000, 9 pages.

(Continued)

*Primary Examiner* — Tina Nguyen
(74) *Attorney, Agent, or Firm* — Alston & Bird LLP

(57) ABSTRACT

Provided are improved SIP communication systems and methods for traversing firewalls, NATs, and ALGs. An encapsulation protocol is used to preserve the original SIP message by encapsulating the original SIP message in visible encapsulation protocol of layers 4+. An encapsulated SIP message is decapsulated after transparently traversing a firewall, NAT, and/or ALG.

55 Claims, 5 Drawing Sheets

OTHER PUBLICATIONS

*A SIP Application level Gateway for Network Address Translation*, B. Biggs, 3COM, Mar. 2000, 7 pages.
*SIP Firewall Solution*, B. Engelholm, Ericsson, Jul. 2000, 14 pages.
*Firewall Enhancement Protocol (FEP)*, RFC 3093, M. Gaynor et al., Harvard University, Apr. 2001, 11 pages.
*Private Extensions to the Session Initiation Protocol (SIP) for Asserted Identity within Trusted Networks*, RFC 3325, C. Jennings et al.., Cisco Systems, Nov. 2002, 18 pages.
*SIP: Session Initiation Protocol*, RFC 2543, M. Handley et al., ACRI, Mar. 199, 153 pages.
*SIP: Session Initiation Protocol*, FRC 3261, J. Rosenberg et al., Dynamicsoft, Jun. 2002, 269 pages.

"Session Initiation Protocol (SIP): Locating SIP Servers; rfc3263.txt" IETF Standard, Internet Engineering Task Force, IETF, CH, Jun. 1, 2002, XP015009041, Rosenberg et al.
"Realm Specific IP: Protocol Specification; rfc3103.txt" IETF Standard, Internet Engineering Task Force, IETF, CH, Oct. 1, 2001, XP015008884 * Sections 1-6 (incl. subsections), 8.4 — 8.6 *Borella et al.
"Standard for the Format of ARPA Internet Text Messages" Aug. 13, 1982 David H. Crocker RFC # 822.
International Search Report for International Application No. PCT/IB2005/002145, mailed Nov. 11, 2005.
International Preliminary Report on Patentability for International Application No. PCT/IB2005/002145, issued Jan. 23, 2007.

* cited by examiner

SYSTEMS AND METHODS FOR ENCAPSULATION BASED SESSION INITIATION PROTOCOL THROUGH NETWORK ADDRESS TRANSLATION

FIELD OF THE INVENTION

The present invention relates generally to telecommunications networks and, more particularly, to systems and methods for performing encapsulation based Session Initiation Protocol (SIP) through network address translation (NAT).

BACKGROUND

One of the limitations of various versions of the Internet Protocol (IP) such as IPv4, is that there are a limited number of addresses. Consequently, in order to conserve addresses, enterprises and other administrative domains have resorted to using private addresses. Private addresses typically are network addresses in which the IP address falls within the ranges of 10.0.0.0-10.255.255.255, 172.16.0.0-172.31.255.255, 192.168.0.0-192.168.255.255.

Private addresses that are assigned by an administrative entity within a private network only have relevance within the respective private network. Accordingly, such private addresses are typically not visible or allowed outside the private network. An advantage of using private addresses, however, is that different private networks may assign the same private IP address to hosts within their respective private networks without any concern of conflict. On the other hand, a Network Address Translator (NAT), which can also function as Network Address Port Translator (NAPT), can be used when a host that is assigned a private address within a private network intends to send an IP datagram to a host that is outside the private network of the sending host. A NAT transforms a private IP address (and possibly other selected fields within the datagram) into a public IP address prior to the IP datagram being sent outside the private network associated with the NAT. With the added functionality of the NAPT, the NAT can further transform ports, such as Transmission Control Protocol (TCP) or User Datagram Protocol (UDP) ports, from the private network to the public network. Similarly, when an IP datagram is sent from a host that is outside the administrative domain associated with the NAT to a host with a private address, then the NAT transforms a public IP address to a private IP address and, with the NAPT added functionality, a port in the public network to a port in the private network.

In addition to providing address and port translations, the NAT can communicate with a firewall and/or gateway that operates as a security mechanism to an associated private network. In this regard, the firewall/gateway can operate to provide security in that, as before incoming datagrams pass through a translation process of the NAT and/or after outgoing datagrams pass through a translation process of the NAT, the firewall/gateway can be capable of qualifying such datagrams. In addition, by translating private IP addresses into public IP addresses, the NAT can be capable of providing a measure of privacy for those associated with the private IP addresses. An application level gateway (ALG) is often referred to as a program running on a firewall or in cooperation with a firewall as part of a network address translator (NAT) to perform network address translation. An ALG typically is capable of understanding application protocol to support not only IP and/or TCP but also UDP based protocols such as TFTP. When combined with NAT to translate IP and TCP address protocols, ALG provides a higher level of security by translating addressing in higher level protocols.

The use of private addresses within a private network and use of a NAT at the edge of a private network has been widely adopted and deployed within enterprises. There are, however, drawbacks associated with use of a NAT. In this regard, consider a private network comprising, connected to or otherwise associated with a mobile network, such as a General Packet Radio Service (GPRS) network. In such instances, a terminating node, such as a mobile terminal, communicating across the mobile network can generally initiate a communication session, such as in accordance with the Session Initiation Protocol (SIP), with an IP device across the NAT. An IP device typically cannot, however, initiate a similar SIP communication session with the terminating node across the NAT. In addition, because terminating nodes typically lack a static and public identity like a fixed IP-address, IP devices often cannot identify a desired terminating node to the NAT.

Additionally, the function of NAT is to modify the IP address, and possibly also the port number, for outgoing source and incoming destination datagrams. Similarly, ALG modifies corresponding IP addresses and port numbers in application protocols of upper layers such as SIP. The modifications typically prevent upper layer application protocols such as SIP from operating properly or even passing through a NAT or firewall (NAT/FW).

These typical configurations of mobile networks prevent an IP device from initiating an SIP communication session with a respective terminating node for a number of reasons. For example, if an upper layer protocol such as SIP is using layer 3 information such as an IP address, the upper layer may not function properly if the information is changed only in layer 3, or in all the layers.

To overcome the drawback of the NAT, ALG, and firewall communication interference to permit IP devices to initiate an SIP communication session with a terminating node, networks can be configured such that each terminating node has a unique, fixed IP address, where those addresses are entered into a respective Domain Name System (DNS) server. The NAT and any security components (e.g., firewall/gateway, etc.) of the network can also be configured to allow an IP device to initiate an SIP communication session with a terminating node and allow routing of traffic to and from the IP address allocated to the terminating node. In addition, for example, network resources required for IP connectivity with each terminating node in the network can be allocated when the terminating node is connected to the network. For example, a bi-directional communication connection can be established, such as a TCP connection out through the firewall to an SIP server. Other solutions include Simple Traversal of UDP through NAT (STUN), running SIP over port 80, using an application layer firewall/NAT configuration that understands SIP, and using a packet filtering firewall/NAT under the control of a proxy server.

Such network-specific configuration techniques for permitting IP devices to initiate an SIP communication session with a terminating node require additional functionality. Thus, it would be desirable to design a system capable of permitting IP devices to initiate an SIP communication session with a terminating node in a mobile or private network that avoids the problems with NAT, ALG, and firewall/gateway limitations.

SUMMARY

In light of the foregoing background, embodiments of the present invention provide improved systems and methods for performing encapsulation based Session Initiation Protocol (SIP) through network address translation (NAT) and application level gateway (ALG) of NAT. Embodiments of the present invention provide transparent SIP/SDP (Session Description Protocol) traversal through NAT, NATP, ALG, and firewall/gateway servers. Embodiments of the present invention are also independent of the particular access network such that the function of SIP/SDP traversal through NAT, NATP, ALG, and firewall/gateway servers is not operator or network specific. By being transparent to the access network, an encapsulated SIP message is advantageously access network independent.

An embodiment of a method of the present invention may bind an encapsulation protocol and an SIP identity, create or receive an SIP message, map the SIP message, and encapsulate the message. The binding may be performed during registration of an SIP client with a network node such as an SIP server. Part of an encapsulated protocol header may be removed, and the SIP client or SIP server may be able to interpret the IP packet of the SIP message with the reduced protocol header. The reduced protocol headers may be identified and bypassed in lieu of headers identified as remaining intact. The encapsulation may be performed between a network and an SIP client or between SIP clients, and when between a network and an SIP client, the network may include an SIP server such as an SIP proxy server, an SIP redirect server, or an SIP registration server. The mapping may be performed over the binding, and binding may occur in the encapsulation end points where encapsulation and decapsulation occur. The encapsulated SIP message may also be received and decapsulated. In this process, after receiving an encapsulated SIP message, a determination may be made that the encapsulation protocol is supported for decapsulating the encapsulated SIP message. A determination may also be made after receiving an SIP message as to whether encapsulation is configured for the destination of the SIP message. Before or as part of decapsulating the SIP message, the source of the encapsulated SIP message may be mapped. Similarly, when an SIP message is received, the destination for the to-be encapsulated SIP message may be mapped. In one example embodiment of the present invention, the encapsulation of the SIP message may use hypertext transfer protocol (HTTP), or a combination of HTTP and any of IP, TCP, and UDP protocols. In a second example embodiment of the present invention, the IP header may be removed from the SIP message as part of encapsulating the SIP message in lieu of the network layer 3 IP address.

An embodiment of a method of the present invention may receive an encapsulated SIP message, determine the encapsulation protocol of the encapsulated SIP message, and decapsulate the encapsulated SIP message according to the encapsulation protocol. The decapsulated SIP message may then be transmitted to a destination, such as a terminating SIP client. The source of the encapsulated SIP message may also be mapped as part of, or just before or after, decapsulating the encapsulated SIP message.

A system for establishing a Session Initiation Protocol (SIP) communication session with an encapsulated SIP message of an embodiment of the present invention may include an SIP message client and an SIP server. The SIP server may be connected to the SIP message client in such a manner to allow for communication between the two devices. Further, the SIP message client and SIP server would both be configured to encapsulate and/or decapsulate an SIP message and/or encapsulated SIP message, respectively, according to at least one common encapsulation protocol for communication of an SIP message. The SIP message client and SIP server may be separated by a firewall, a network address translator (NAT), or an application level gateway (ALG). In one example embodiment of a system of the present invention, the SIP message client and SIP server may be separated across a public network. In other example embodiments of the present invention, the SIP message client may be a terminal located in a private network or a mobile terminal located in a mobile network.

A system for establishing a Session Initiation Protocol (SIP) communication session with an encapsulated SIP message of an embodiment of the present invention may include an SIP message client and a network node. The two may be connected in such a manner to allow for communication between the two devices. Further, the SIP message client may be configured to encapsulate or decapsulate an SIP message or encapsulated SIP message. The SIP message client may be preconfigured with an SIP identity. And a binding may be configured between the SIP identity of the SIP message client and at least one encapsulation protocol. Alternatively, SIP identity may not be preconfigured but delivered by the network dynamically based upon some triggering event such as a client detecting that the SIP identity of the client is missing and requesting or fetching the SIP identity from the network.

Embodiments of the present invention of associated terminals and SIP servers are also provided which each include a controller capable of performing the above described functions. These characteristics, as well as additional details, of the present invention are further described herein with reference to these and other embodiments.

BRIEF DESCRIPTION OF THE DRAWINGS

Figure 1:
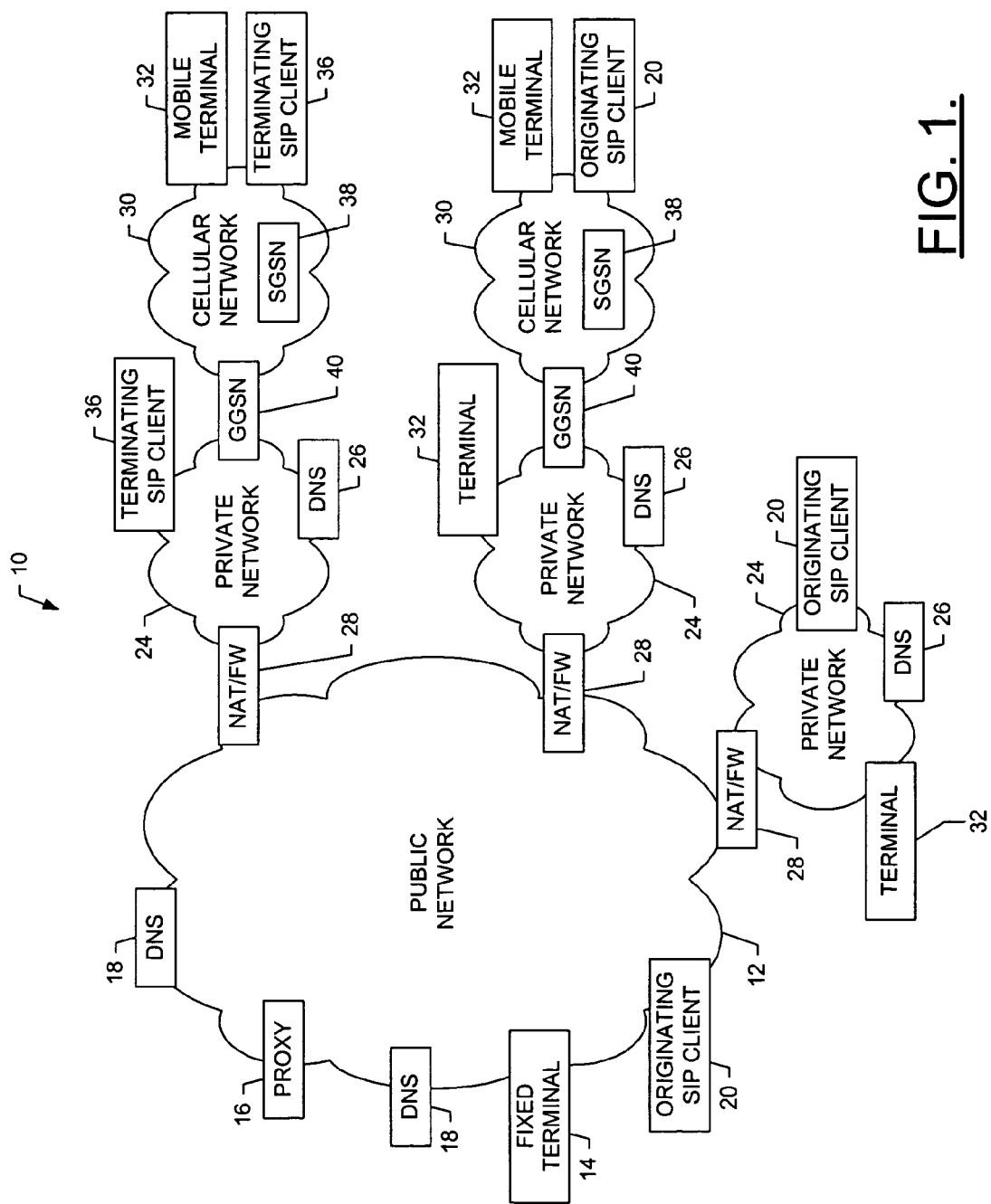
Figure 2:
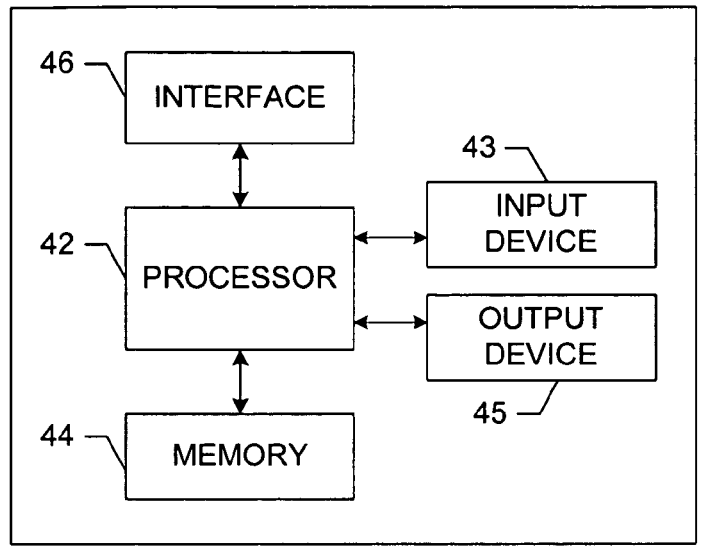
Figure 3:
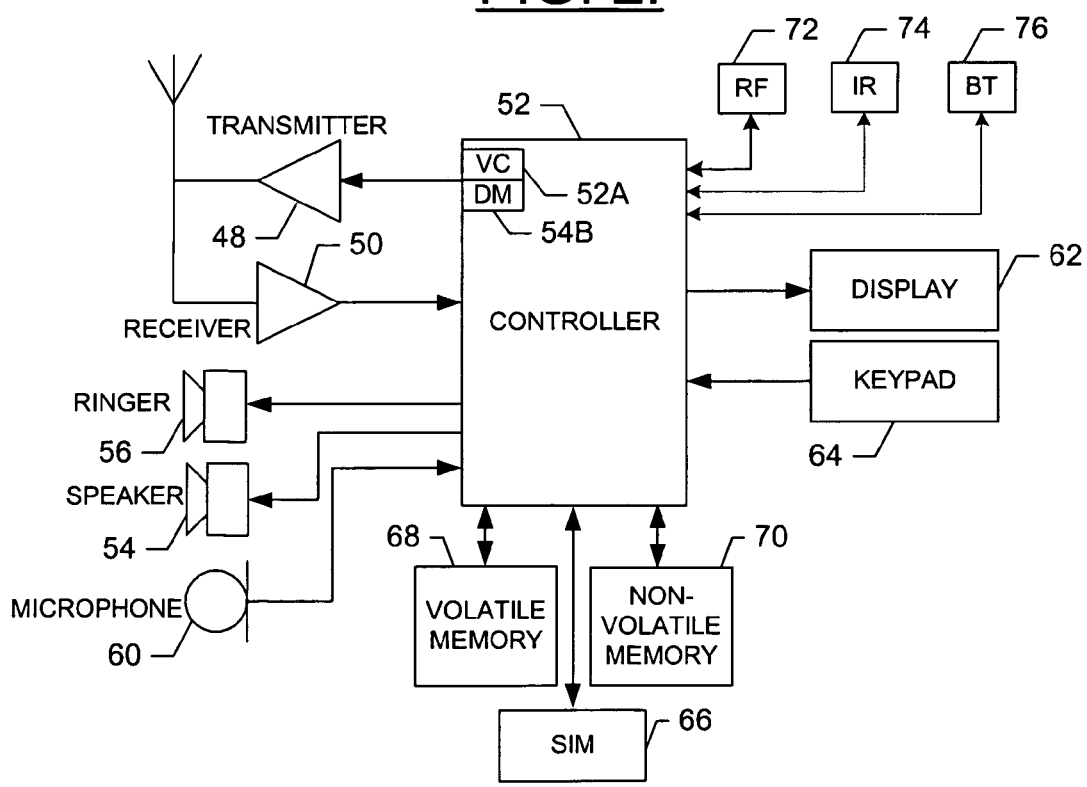
Figure 4:
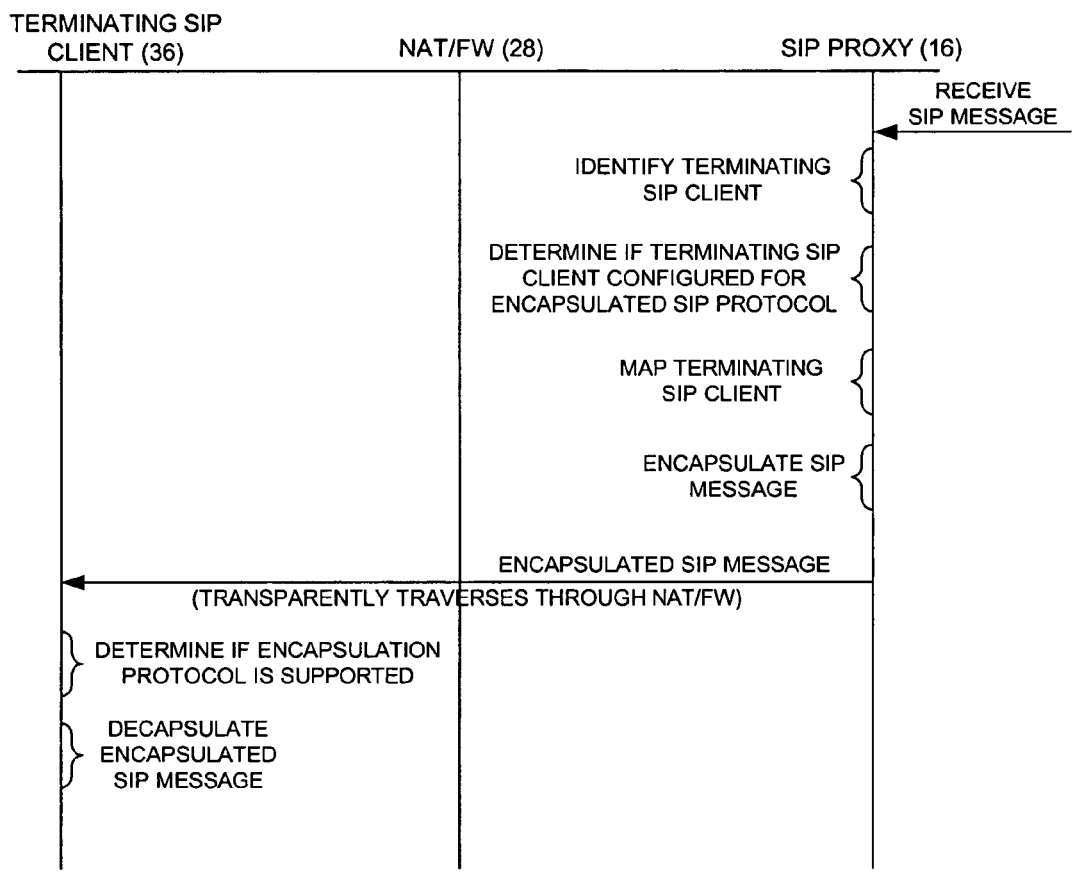
Figure 5:
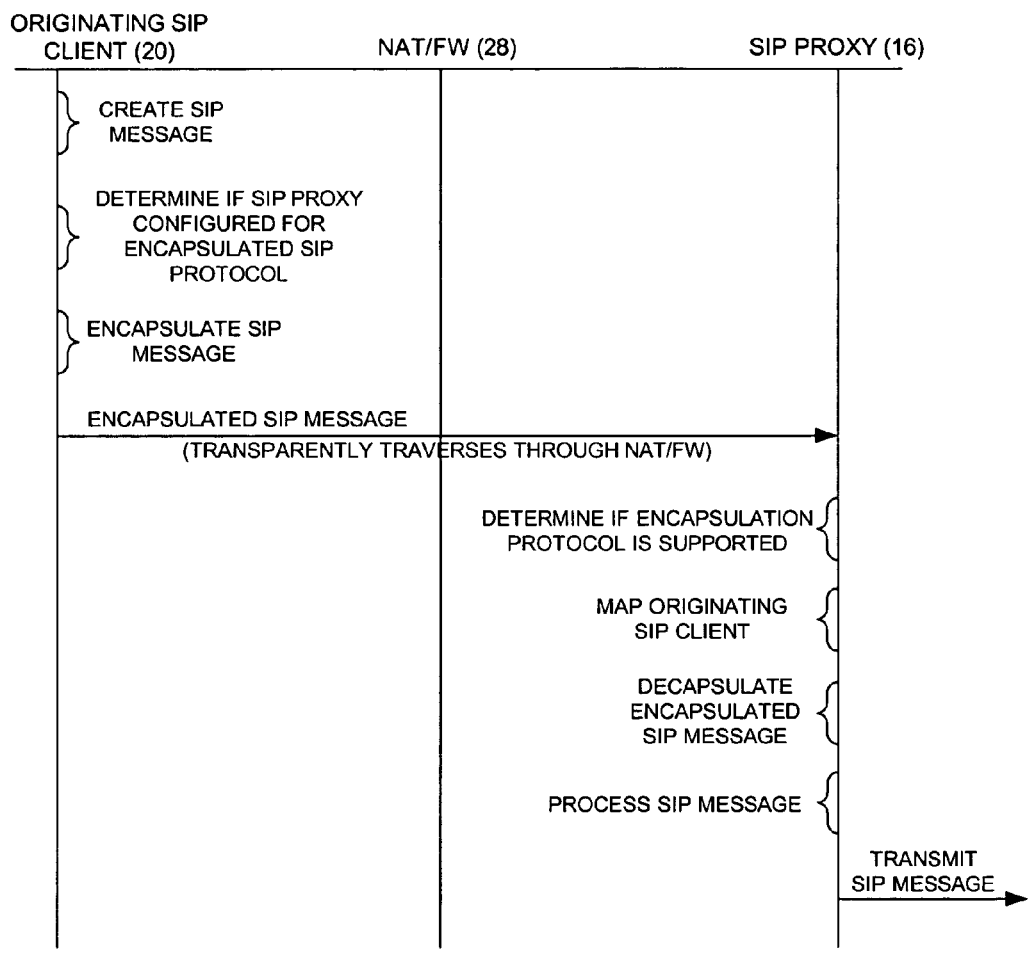
Figure 6:
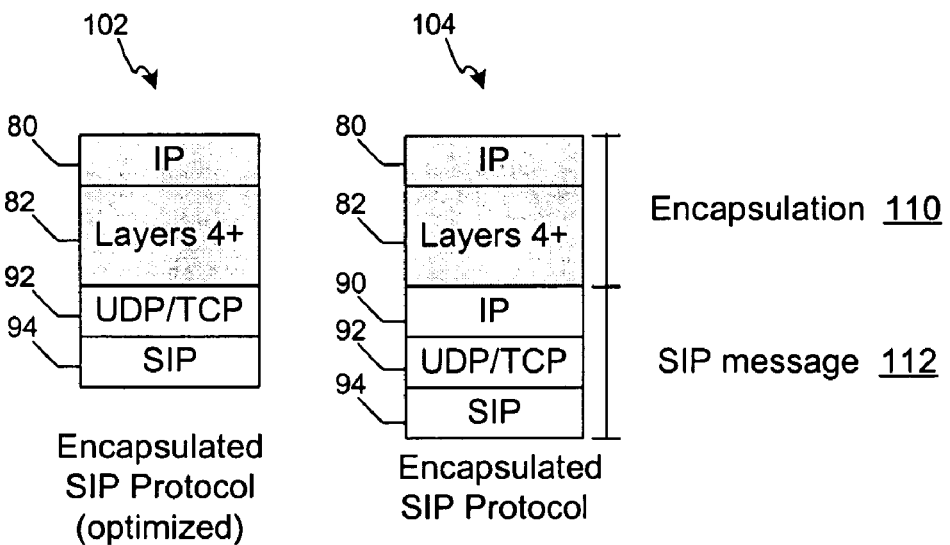
Figure 7:
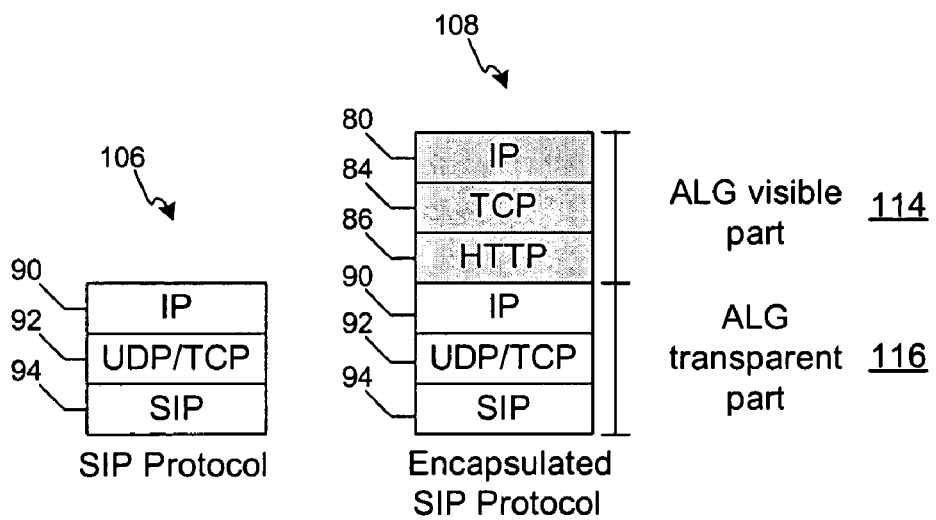

Having thus described the invention in general terms, reference will now be made to the accompanying drawings, which are not necessarily drawn to scale, and wherein:

FIG. 1 is a schematic block diagram of a communications system according to one embodiment of the present invention including a public network and a mobile network to which an originating SIP client and a terminating SIP client are bi-directionally coupled directly or indirectly;

FIG. 2 is a schematic block diagram of an entity capable of operating as an SIP client, in accordance with embodiments of the present invention;

FIG. 3 is a schematic block diagram of a mobile station that may operate as an SIP client, according to embodiments of the present invention;

FIG. 4 is a control flow diagram illustrating a system for and method of encapsulation based SIP communications from an SIP proxy server to a terminating SIP client in accordance with one embodiment of the present invention;

FIG. 5 is a control flow diagram illustrating a system for and method of encapsulation based SIP communications from an originating SIP client to an SIP proxy server in accordance with one embodiment of the present invention;

FIG. 6 are block diagrams of encapsulated SIP protocol of one embodiment of the present invention; and FIG. 7 are block diagrams of decapsulated and encapsulated SIP protocol of one embodiment of the present invention.

DETAILED DESCRIPTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

While a primary use of the present invention may be in the field of mobile phone technology, it will be appreciated from the following description that embodiments of the invention are also useful for many types of devices that are generally referenced herein as mobile terminals, including, for example, handheld data terminals and personal data assistants, portable medical devices, personal multimedia units such as video or audio players (e.g., MP3 players), handheld PC devices, and other portable electronics, including devices that are combinations of the aforementioned devices. Similarly, one of ordinary skill in the art will recognize that, while the present invention is particularly useful for mobile and wireless devices, embodiments of the present invention may be used with various other devices, as well as any type of application protocol behind a NAT/FW for transparent traversal through the NAT/FW.

As used herein, all of the following types of SIP servers are collectively referred to as SIP servers: SIP proxy server, SIP redirect server, SIP registration server, and other SIP servers. Embodiments of the present invention are described with reference to SIP proxy servers, however, as one of ordinary skill in the art will recognize, the present invention is applicable to different types of SIP servers.

As used herein, NAT may refer to a hardware device or application routine, a network address translator, or to the process of network address translation. These concepts are related in that a network address translator performs network address translation, and thus NAT is used for both.

Referring to FIG. 1, an illustration of one type of system that would benefit from the present invention is provided. The system and method of embodiments of the present invention will be primarily described in conjunction with mobile communications applications. It should be understood, however, that the system and method of embodiments of the present invention can be utilized in conjunction with a variety of other applications, both in the mobile communications industries and outside of the mobile communications industries.

As shown, the system 10 includes a public network 12, such as a public Internet Protocol (IP) network like the Internet. The public network 12 includes a number of network nodes, each of which typically comprise a processing element such as a server computer, personal computer, laptop computer or the like. More particularly, the public network 12 can include one or more network nodes comprising fixed terminals 14, each of which are capable of communicating within or across the public network 12. The network nodes of the public network 12 can also include a proxy server 16, such as Session Initiation Protocol (SIP) proxy server. As will be appreciated, protocol such as SIP provide an application layer signaling protocol related to multimedia sessions (see, e.g., IETF request for comment document RFC 3261, entitled: SIP: Session Initiation Protocol, June 2002, the contents of which are hereby incorporated by reference in its entirety). The SIP proxy server is therefore capable of receiving and forwarding SIP signaling messages, such as SIP signaling messages to and/or from a network node comprising a fixed terminal operating as an originating SIP client 20, as such is described in greater detail below.

In addition, the public network 12 can include one or more Domain Name System (DNS) servers 18. In this regard, each network node typically has a unique IP address that has an associated, typically easier to recall, host DNS name. The DNS servers, then, can be capable of transforming a host DNS name into the associated IP address such that network traffic can be routed to the appropriate network node.

In addition to the public network 12, the system 10 includes one or more private networks 24, such as Local Area Networks (LANs). Each private network, like the public network, can include a number of network nodes. Also, like the public network 12, the network nodes of each private network can include one or more DNS servers 26. Similar to before, the DNS servers of the private networks can be capable of transforming a host DNS name into an associated IP address such that network traffic can be routed to the appropriate public or network node. The private network 24 can also include one or more network nodes comprising mobile terminals 32, each of which are capable of communicating within or across the private network. The terminals 32 can comprise, for example, mobile telephones, portable digital assistants (PDAs), pagers, laptop computers, smart cards and other types of electronic systems.

To facilitate the terminals 32 accessing the private network, the private network 24 can include one or more wireless access points (WAPs) (not shown), each of which can be coupled to one or more terminals. In this regard, WAPs can comprise access points (APs) configured to communicate with the terminal in accordance with techniques such as, for example, radio frequency (RF), Bluetooth (BT), infrared (IR or IrDA) or any of a number of different wireline and/or wireless networking techniques, including LAN and/or WLAN techniques. Also like the public network 12, the private network 24 can include an originating SIP client 20, which is described in greater detail below. As described below, the private network can include a terminating SIP client 36, which can be capable of communicating with an originating SIP client 20. And as also described below, one or more of the terminals of the private network can be capable of operating as an originating SIP client or a terminating SIP client.

To facilitate communications between network nodes of the public network 12 and network nodes of the private networks 24, each private network 24 can further include a Network Address Translator (NAT) interconnecting the public network and the private network. As explained above in the background section, each NAT can be capable of transforming a public IP address from the public network into a private IP address of a network node of a respective private network, and vice versa, for communications between the public network and the respective private network. As will be appreciated, the NAT can also include an Application Level Gateway (ALG) (not shown) capable of transforming IP addresses embedded in, for example, application protocol data units (PDUs). In addition, the NAT can include or be associated with a firewall and/or gateway for the respective private network. As shown, then, a NAT including or associated with a firewall/gateway is shown as a NAT/FW 28.

The system 10 can also include one or more mobile or cellular networks 30. The cellular networks can comprise one or more of a number of different mobile networks. In this regard, the cellular networks may be any of a number of first-generation (1G), second-generation (2G), 2.5G and/or third-generation (3G) cellular networks, and/or any of a number of other cellular networks capable of operating in accordance with embodiments of the present invention. For example, each cellular network can comprise a GSM (Global System for Mobile Communication), IS-136 (Time Domain Multiple Access—TDMA), IS-95 (Code Division Multiple Access—CDMA), or EDGE (Enhanced Data GSM Environment) network. Alternatively, one or more of the cellular networks can comprise GPRS (General Packet Radio Service) or GPRS-based networks, or newer generation networks, such as Universal Mobile Telecommunications System (UMTS) networks.

Like the public 12 and private 24 networks, the cellular networks 30 also include one or more network nodes. In this regard, the network nodes of each cellular network can include one or more mobile terminals 32 capable of communicating within and/or across a respective cellular network. And as described below, one or more of the mobile terminals are capable of operating as an originating SIP client 20, such as in the same manner as the originating nodes of the public and private networks. In addition, as also described below, one or more of the mobile terminals 32 are capable of operating as a terminating SIP client 38 which, as indicated above and described below, can be capable of communicating with an originating SIP client 20 via an SIP proxy server 16 in accordance with SIP.

Within the cellular networks 30, the network nodes can also include one or more network signaling support nodes such as one or more SGSNs (signaling GPRS support nodes) 38, and one or more gateway support nodes such as one or more GGSNs (gateway GPRS support nodes) 40.

For example, the network nodes can include one or more SGSNs and one or more GGSNs, as such are described in a number of specifications of the 3G Partnership Project (3GPP). As will be appreciated by those skilled in the art, the SGSNs are capable of routing communications to and from the mobile terminals 32, and can also provide a connection to the other network nodes when the terminals are involved in a communication session with such network nodes. The GGSNs, on the other hand, are capable of interconnecting the cellular networks and the private networks 24. In this regard, the GGSNs are capable of performing traditional gateway actions, as such are well known. It should be noted that although the cellular networks can include SGSNs and GGSNs, the cellular networks can include other similar operating network nodes for other types of cellular networks.

Reference is now made to FIG. 2, which illustrates a block diagram of an entity capable of operating as a network node (e.g., SIP proxy server 16, originating SIP client 20, NAT/FW 28, terminating SIP client 36, SGSN 38, GGSN 40, etc.) within the public network 12, private networks 24 or cellular networks 30, in accordance with one embodiment of the present invention. Although shown as separate entities, in some embodiments, one or more entities may support one or more of the network nodes, logically separated but co-located within the entity (entities). For example, a single entity may support a logically separate, but co-located, originating SIP client and SIP proxy server. Also, for example, as indicated above, a single entity may support a logically separate, but co-located NAT and firewall/gateway.

As shown, the entity capable of operating as a network node can generally include a processor, controller, or the like 42 connected to a memory 44. The processor can also be connected to at least one interface 46 or other means for transmitting and/or receiving data, content, or the like. The memory 44 can include volatile and/or non-volatile memory and typically stores content, data, or the like. For example, the memory 44 typically stores software applications, instructions, or the like for the processor 42 to perform steps associated with operation of the entity in accordance with embodiments of the present invention. Also, for example, the memory 44 typically stores content transmitted from, or received by, the network node. Memory 44 may be, for example, random access memory (RAM), a hard drive, or other fixed data memory or storage device. The processor 42 may receive input from an input device 43 and may display information on a display 45. Where the entity provides wireless communication, such as a mobile network, the processor 42 may operate with a wireless communication subsystem (not shown) in the interface 46. Mobile network includes a cellular network, and may also include a private network using such communication technologies as IR, BT, or the like. One or more processors, memory, storage devices, and other computer elements may be used in common by a computer system and subsystems, as part of the same platform, or processors may be distributed between a computer system and subsystems, as parts of multiple platforms.

FIG. 3 illustrates a functional diagram of a mobile station that may operate as a mobile terminal 32 and, as such, an originating SIP client 20 or terminating SIP client 36, according to embodiments of the invention. It should be understood, that the mobile station illustrated and hereinafter described is merely illustrative of one type of mobile terminal that would benefit from the present invention and, therefore, should not be taken to limit the scope of the present invention. While several embodiments of the mobile station are hereinafter described for purposes of example, other types of mobile terminals, such as portable digital assistants (PDAs), pagers, laptop computers, and other types of voice and text communications systems, can readily employ the present invention.

The mobile station includes a transmitter 48, a receiver 50, and a controller 52 that provides signals to and receives signals from the transmitter 48 and receiver 50, respectively. These signals include signaling information in accordance with the air interface standard of the applicable cellular system, and also user speech and/or user generated data. In this regard, the mobile station can be capable of operating with one or more air interface standards, communication protocols, modulation types, and access types. More particularly, the mobile station can be capable of operating in accordance with any of a number of 1G, 2G, 2.5G and/or 3G communication protocols or the like. For example, the mobile station may be capable of operating in accordance with 2G wireless communication protocols IS-136 (TDMA), GSM, and IS-95 (CDMA). Also, for example, the mobile station may be capable of operating in accordance with 2.5G wireless communication protocols GPRS, Enhanced Data GSM Environment (EDGE), or the like. Some narrow-band AMPS (NAMPS), as well as TACS, mobile stations may also benefit from embodiments of the present invention, as should dual or higher mode mobile stations (e.g., digital/analog or TDMA/CDMA/analog phones).

It is understood that the controller 52, such as a processor or the like, includes the circuitry required for implementing the audio and logic functions of the mobile station. For example, the controller may be comprised of a digital signal processor device, a microprocessor device, and various analog to digital converters, digital to analog converters, and other support circuits. The control and signal processing functions of the mobile station are allocated between these devices according to their respective capabilities. The controller 52 thus also includes the functionality to convolutionally encode and interleave message and data prior to modulation and transmission. The controller 52 can additionally include an internal voice coder (VC) 52A, and may include an internal data modem (DM) 52B. Further, the controller 52 may include the functionally to operate one or more software applications, which may be stored in memory.

The mobile station also comprises a user interface including a conventional earphone or speaker 54, a ringer 56, a microphone 60, a display 62, and a user input interface, all of which are coupled to the controller 52. The user input interface, which allows the mobile station to receive data, can comprise any of a number of devices allowing the mobile station to receive data, such as a keypad 64, a touch display (not shown) or other input device. In embodiments including a keypad, the keypad can include the conventional numeric (0-9) and related keys (#, *), and other keys used for operating the mobile station.

Although not shown, the mobile station can further include an IR transceiver (not shown) or another local data transfer device so that data can be shared with and/or obtained from other devices such as other mobile stations, car guidance systems, personal computers, printers, printed materials including barcodes, and the like. The sharing of data, as well as the remote sharing of data, can also be provided according to a number of different techniques. For example, the mobile station may include a radio frequency (RF) transceiver 72 capable of sharing data with other radio frequency transceivers, and/or with a Radio Frequency Identification (RFID) transponder tag, as such is known to those skilled in the art. Additionally, or alternatively, the mobile station may share data using an infrared (IR) transceiver 74 or using Bluetooth (BT) brand wireless technology developed by the Bluetooth Special Interest Group and a BT transceiver 76. Further, the mobile station may be capable of sharing data in accordance with any of a number of different wireline and/or wireless networking techniques, including LAN and/or WLAN techniques.

The mobile station can also include memory, such as a subscriber identity module (SIM) 66, a removable user identity module (R-UIM) (not shown), or the like, which typically stores information elements related to a mobile subscriber. In addition to the SIM, the mobile station can include other memory. In this regard, the mobile station can include volatile memory 68, as well as other non-volatile memory 70, which can be embedded and/or may be removable. For example, the other non-volatile memory may be embedded or removable multimedia memory cards (MMCs), Memory Sticks as manufactured by Sony Corporation, EEPROM, flash memory, hard disk, or the like. The memory can store any of a number of pieces or amount of information and data used by the mobile station to implement the functions of the mobile station. For example, the memory can store an identifier, such as an international mobile equipment identification (IMEI) code, international mobile subscriber identification (IMSI) code, mobile station integrated services digital network (MSISDN) code, or the like, capable of uniquely identifying the mobile station. The memory can also store content, such as that to transmit to a terminating SIP client 36 or that received from an originating SIP client 20.

As indicated in the background section, conventional and developing techniques for SIP communications are limited by NAT, NAPT, ALG, and firewall/gateway server functionality. Thus, embodiments of the present invention provide an improved system and method for communicating with a terminating node, where the terminating node resides in a network behind a firewall/gateway server or operating NAT. More particularly, embodiments of the present invention provide a system and method that permit originating SIP clients to initiate an SIP connection with terminating SIP clients by transparently traversing SIP messages through NAT/FW. As described below, the originating SIP client initiates communication with a terminating SIP client comprising a terminal within a cellular network 30. It should be understood, however, that the terminating SIP client can alternatively comprise a network node of a private network, without departing from the spirit and scope of the present invention.

As well known to those skilled in the art, SIP is an application-layer control protocol that can establish, modify and terminate multimedia sessions or calls. SIP is text-based, using ISO 10646 in UTF-8 encoding throughout. The syntax of the messages is similar to HTTP, except that SIP can carry the transaction using either User Datagram Protocol (UDP) or Transmission Control Protocol (TCP). An SIP message can typically be characterized as either a request or a response, and it can be created following the format of Internet Engineering Task Force (IETF) request for comment document RFC 822, entitled: *Standard for the Format of ARPA Internet Text Messages,* August 1982, the contents of which are hereby incorporated by reference in its entirety.

Generally, the entities involved in an SIP session include a user agent (e.g., originating SIP client 20, terminating SIP client 36, etc.), the SIP proxy server 16, a registrar and a location service. The user agent can function as a client (UAC) that initiates an SIP request. The user agent can also operate as a server (UAS) that contacts the user when an SIP request is received, and sends back a response on behalf of the user. The SIP proxy server 16, as indicated above, comprises an intermediate entity that can simultaneously function like a client and server. In this regard, the SIP proxy server can interpret and modify an SIP request before forwarding it to other servers. The registrar, which can be implemented in the SIP proxy server, accepts user registrations (e.g., REGISTER messages) and can make this information available through a location service, also capable of being implemented in the SIP proxy server. The location service, then, comprises an element used by the SIP proxy server to obtain information about the possible location of a terminating SIP client 36.

An SIP message generally comprises a start line, one or more header fields, an empty line (carriage-return line-feed—CRLF) and an optional body. Generally, the start line of an SIP message indicates if the message is a request (e.g., INVITE, ACK, OPTIONS, BYE, CANCEL, REGISTER, etc.) or a response (e.g., 100 Informational, 200 Success, 300 Redirection, 400 Client Error, 500 Server Error, 600 Global Failure, etc.). The message header can include multiple headers indicating, for example, the source ("From"), destination ("To"), call identifier ("Call-ID"), message sequence ("Cseq"), contact ("Contact"), transaction path ("Via"), length ("Content-Length") and content ("Content-Type") of the body, if carried in the message. The message body, on the other hand, can include any of a number of different types of data, the interpretation of which typically depends upon the type of message. Generally, the content of the body can contain a session description following a specific format such as the Session Description Protocol (SDP), text, or Extensible Markup Language (XML) scripts. In this regard, the "Content-Type" header field gives the media type of the message body. And the body length is typically given in the "Content-Length" header field.

The entities addressed by SIP can include users that can be accessed via SIP proxies 16 supporting such users, where the users can be identified by an SIP uniform resource locator (URL). Generally, SIP URLs are used within SIP messages to indicate, for example, the originator (From), the current destination in the start line (request URL), and the final recipient (To) of an SIP request. As will be appreciated, the URL can take a form such as "user@host" where "user" typically identifies a user (e.g., user name, telephone number, etc.) and "host" identifies an SIP proxy server (e.g., domain name, IP address, etc.) supporting the user. In this regard, SIP URLs can be used for locating a user based upon a domain name-to-IP address translation by a DNS server 18, particularly when the URL includes the domain name of the respective SIP proxy server 16. In this regard, the originator can query the DNS server including the destination address including the domain name of the SIP proxy server 16.

As indicated above, the system 10 can include an originating SIP client 20 and a terminating SIP client 36. Generally, the originating SIP client is capable of requesting a connection with a terminating SIP client via an SIP proxy server 16 supporting the terminating SIP client 36. The originating SIP client 20 can also generally operate as a peer node of an SIP communication session. Likewise, the terminating node 36 can be capable of operating as another peer node of an SIP communication session. And as well known to those skilled in the art, the SIP proxy server 16 can be capable of forwarding SIP signaling messages to the terminating SIP client 36 from the originating SIP client 20, and vice versa. In contrast to conventional SIP communication techniques, however, when the terminating SIP client is located behind a NAT/FW 28 from the originating SIP client 20, the SIP proxy server 16 may not be capable of identifying the terminating SIP client 36 across the NAT/FW when the originating SIP client 20 desires to initiate an SIP communication session with the terminating SIP client 36. More particularly, for example, the SIP proxy server 16 may not be capable of identifying the terminating SIP client 36 when the NAT/FW 28 no longer maintains a translation table entry for the terminating SIP client 36 or the SIP proxy server 16 no longer maintains a registration for a public IP address and port assigned by the NAT/FW 28 to the terminating SIP client 36. Furthermore, when an SIP client resides behind a NAT/FW, the functionality of the NAT or FW may prevent transmission or logical traversal of an SIP message.

Referring to FIG. 4, a control flow diagram illustrating a system for a method of encapsulation based SIP communications from an SIP proxy server to a terminating SIP client in accordance with one embodiment of the present invention is provided. The overall signaling paths for SIP messages remain the same even when using encapsulated SIP messages of embodiments of the present invention as described below. The SIP proxy server 16 receives an SIP message from a network node. The SIP proxy server identifies the terminating SIP client from the addressing information in the SIP message which has been received. Based upon the identified terminating SIP client, the SIP proxy server 16 may determine whether the terminating SIP client is configured for encapsulated SIP messages and protocol. This determination is based upon the identity of the terminating SIP client and the configuration that has been previously provided to the SIP proxy server 16, such as the information that the SIP client resides behind a firewall/gateway or network address translator (NAT) and requires encapsulation of SIP messages. The configuration may also specify a particular encapsulation protocol desired for use with the SIP client or include a list of compatible encapsulation protocols that may be used for encapsulating an SIP message destined for the terminating SIP client. The information related to configured encapsulation protocols is required because both the client and server need to be using the same encapsulation protocol, or compatible encapsulation protocols, for a proper interpretation of the information provided in the encapsulated SIP message. Alternatively to a preconfigured encapsulation protocol or a list of encapsulation protocols, an SIP client may identify an encapsulation protocol such as when returning an encapsulated SIP message, received from the SIP server, in a protocol that is not supported by the client, thus allowing the SIP server to re-encapsulate the SIP message according to the requested encapsulation protocol and retransmit the newly encapsulated SIP message to the SIP client. An encapsulation method may not be preconfigured but delivered by the network dynamically based upon some triggering event such as a client detecting that the client does not know whether it should use encapsulation or not and querying this determination from the network for an answer that may include, for example, a preferred encapsulation method. One of ordinary skill in the art will recognize that specifying a particular encapsulation protocol is appropriate for an SIP client during registration and transmission of a message. One of ordinary skill in the art will also recognize that an SIP proxy may be able to specify a particular encapsulation protocol if the connection with the SIP client is stateless, referring to connectionless transport such as UDP or a connection through a firewall without NAT. However, in the case of TCP-based encapsulation, an SIP proxy would select the same encapsulation used or selected during the SIP registration phase where the encapsulation includes specific state information about NAT.

One of ordinary skill in the art will recognize that various encapsulation protocols may be used with embodiments of the present invention. However to support the transparency through firewalls/gateways and network address translators (NATs), one of ordinary skill in the art will recognize that visible addressing such as IP addresses or port numbers would not be identified in layers 4-7 of the datagram but would be encapsulated or hidden by the protocol such that a firewall/gateway or network address translator (NAT) does not identify or modify the addressing. For example, an encapsulation protocol may be a stand alone set of different protocols of multiple layers such as a protocol built upon IP+TCP+HTTP. One of ordinary skill in the art will also recognize that such an encapsulation protocol would function well if the encapsulation protocol is a standalone protocol that does not require any additional protocol(s) for interpretation, encapsulation, or decapsulation. However, one of ordinary skill in the art will also recognize that the encapsulation protocol may take advantage of addressing in the lower layers such as the network layer 3 IP address that may be the same as an IP address in the unencapsulated SIP message. The encapsulation protocol may remove the unnecessary IP header from the SIP message to decrease the protocol overhead during encapsulation and replace the SIP IP address with the layer 3 SIP address during decapsulation of the encapsulated SIP message. One of ordinary skill in the art may see that an application level gateway (ALG) may be fully supporting of the encapsulation protocol for an embodiment of the present invention. However, in order to avoid the requirement for additional network functionality, the encapsulation protocol may be transparent even to an application level gateway (ALG) such that the encapsulated SIP message may pass through NAT and ALG as being transparent just as the encapsulated SIP message passes through a firewall/gateway. That is, because of the encapsulation of the SIP message and transparent traversal through NAT and ALG, there is no need for an SIP ALG. One of ordinary skill in the art will also recognize, as previously mentioned, that the SIP proxy server 16 in FIG. 4 is only an example of an embodiment of the present invention, and that SIP redirection and registration servers may also employ embodiments of the present invention.

Returning to FIG. 4, as part of, or before or after, encapsulating the SIP message, the SIP proxy server 16 may map the terminating SIP client. This additional mapping functionality may be performed in the SIP proxy server between the SIP identity and encapsulation end-point. The mapping is done between the SIP identity and a virtual channel, such as encapsulation, over which upstream and downstream SIP data may be transferred to or from a terminal. The mapping conforms to an existing terminal initiated connection such as created when an SIP client registers with an SIP proxy server. For example, the destination SIP client may be registered and configured on the SIP proxy with a proper encapsulation protocol and corresponding address that are used to map the encapsulated SIP message to the destination SIP client rather than using the standard SIP contact address. Mapping, typically, would be performed during, or just before, encapsulation, but may also be performed during, or just before or after, decapsulation such as to perform a check that the inner and outer IP addresses are the same. By way of an example mapping routine, an SIP proxy may assign a unique ID for each encapsulation used by SIP registration phase; e.g. ID-1, ID-2, . . . , ID-n. The SIP client may have the SIP identity user@SIPdomain and the SIP client may use encapsulation during the registration. A new binding between the SIP identity user@SIPdomain and the encapsulation ID (ID-m) would be created. As used herein, a "binding" is meant to describe a logical association, match, and/or pairing between identified information, elements, and/or data. When an SIP proxy receives an SIP message destined to the SIP identity user@SIPdomain, the SIP proxy may check whether the destination has an active registration and whether the destination has binding with some encapsulation. If registration is found for the destination and the destination has binding to the encapsulation, then encapsulation information, such as encapsulation protocol, etc. may be found based on the encapsulation ID (ID-m). In such case, the use of an SIP contact address may be replaced by the use of encapsulation in the sense that the contact address cannot be used to contact the SIP client; thus, the existing encapsulation may be used instead. It should be noted, that typically there may be a one to one (1:1) relation between encapsulation and SIP registration; i.e., all traffic destined to an SIP client will use the same encapsulation that this client was using during its SIP registration phase, no matter source is the originating SIP client.

The SIP proxy server 16 encapsulates the SIP message based upon a selected encapsulation protocol as previously described herein. The encapsulated SIP message is then transmitted across a firewall/gateway and/or network address translator (NAT/FW) 28 to the terminating SIP client 36. Because the SIP message has been encapsulated, it transparently traverses through the NAT/FW 28. Upon receipt of the encapsulated SIP message, the terminating SIP client 36 determines if the encapsulation protocol used by the SIP proxy server 16 is supported by the terminating SIP client 36. If the encapsulation protocol is supported, the terminating SIP client 36 can decapsulate the encapsulated SIP message and process the SIP message.

Referring to FIG. 5, provided is a control flow diagram illustrating a system for a method of encapsulation based SIP communications from an originating SIP client to an SIP proxy server in accordance with one embodiment of the present invention. The originating SIP client 20 creates an SIP message. Based upon any of the SIP proxy server 16, destination SIP client (not shown), and presence of the originating SIP client 20 being behind a NAT/FW 28, the originating SIP client 20 may determine whether to encapsulate the SIP message. For example, the originating SIP client 20 may determine that the SIP proxy server 16 is configured for encapsulated SIP protocol, such as based upon an existing configuration or a dynamic method not requiring pre-configuration where the information may be delivered to and/or stored in the terminal. The originating SIP client 20 would then encapsulate the SIP message and transmit the encapsulated SIP message to the SIP proxy server 16. The message will transparently traverse through the NAT/FW 28 because of the encapsulation of the SIP message. The SIP proxy server 16 receiving the encapsulated SIP message will determine if the encapsulation protocol used by the originating SIP client 20 is supported by the SIP proxy server 16. The SIP proxy server 16 may map the source of the SIP message as the originating SIP client 20 and decapsulate the encapsulated SIP message according to the encapsulation protocol. The SIP proxy server 16 may then process the SIP message as it would any other SIP message received. The SIP message may then be transmitted to the destination SIP client. Alternatively, the SIP proxy server 16 may perform similar steps as described with reference to FIG. 4 of identifying a terminating SIP client, determining if the terminating SIP client is configured for encapsulation SIP protocol, mapping the terminating SIP client, and encapsulating the SIP message before transmitting the SIP message, or now encapsulated SIP message, to the destination SIP client.

FIG. 6 are block diagrams of encapsulated SIP protocol of one embodiment of the present invention. In each of the encapsulated protocols 102, 104, the SIP message 112 is encapsulated below the layer 3 IP header 80 and the visible encapsulation of layers 4+ 82. The SIP message originally would include an IP header 90, a UDP or TCP header 92, and the SIP message protocol 94. However, as can be seen in the encapsulated SIP protocol 102, the IP header of the SIP message 90 may be removed by the encapsulation protocol in lieu of the IP header 80 of the encapsulation. Only the encapsulation 110 would be layers and protocols recognized as visible to the firewall/gateway and network address translator (NAT) or application level gateway (ALG). The SIP message 112 would be encapsulated below the visible layers 4+ as a transparent part of the message beneath the layers 4+ visible to the firewall/gateway and network address translator (NAT) or application level gateway (ALG). One of ordinary skill in the art will recognize that the encapsulated SIP protocol 102 labeled as "optimized" is only one of many variations of the standard encapsulated SIP protocol 104 that may be used as embodiments of the present invention.

FIG. 7 are block diagrams of decapsulated and encapsulated SIP protocol of one embodiment of the present invention. FIG. 7 is an example optimization of removing duplicate and/or unnecessary headers or header information to minimize overall protocol size or overhead that normally occurs when tunneling data. The example of FIG. 7 includes an encapsulation protocol which uses hypertext transfer protocol (HTTP) for transparently encoding an SIP message. The SIP protocol 106 includes the IP header 90, UDP or TCP header 92, and the SIP message 94. The encapsulated SIP protocol 108 includes these same elements as well as the encapsulation which includes the IP header 80, TCP header 84, and the hypertext transfer protocol (HTTP) encapsulation 86. Only the encapsulation is visible to an application level gateway (ALG), or firewall/gateway or network address translator (NAT). An application level gateway (ALG) would not recognize the transparent portion 116 of the encapsulated SIP protocol 108. The encapsulation of the SIP protocol in FIGS. 6 and 7 are generic, so as to be allowed by default by firewalls/gateways. This provides transparent transversal of the encapsulated SIP protocol through the firewall/gateway. IP addresses and/or port numbers are only used in upper layers. From FIGS. 6 and 7, one can see that the SIP encapsulated SIP protocol remains the same as the original SIP protocol 94. From a limited internal firewall perspective, by comparison to a network address translator (NAT), application level gateway (ALG), or external to a firewall, if hypertext transfer protocol (HTTP) is used as an encapsulation protocol, the method described in IETF request for comment document RFC 3093, entitled *Firewall Enhancement Protocol (FEP)*, April 2001, the contents of which are incorporated herein by reference in its entirety, may be used for traversal through firewalls by encoding an IP header in an HTTP body and TCP into HTTP headers. However, one of ordinary skill in the art will recognize that this example encapsulation protocol would need to be expanded and/or built upon for SIP protocol encapsulation in accordance with the present invention to account for NAT, ALG, and traversal of a firewall from outside a private network.

One of ordinary skill in the art will recognize that the mapping during, or just before or after, decapsulation may be used to perform an additional semantic check such as to check that the outer and inner IP address are the same. Further because no address is exchanged in the SIP message protocol 94, the SIP message security is not compromised and may remain encrypted. An ALG could be configured to read into an encapsulated SIP message. Alternatively, if encryption is used as part of the encapsulation, then only the end-points of the encapsulation would be able to decrypt the content.

One of ordinary skill in the art will also recognize that the present invention may be incorporated into software systems and subsystems, as well as various other applications. In each of these systems as well as other systems, including dedicated systems, capable of hosting the system and method of the present invention as described above, the system generally can include a computer system, such as described with reference to FIG. 2, including one or more processors that are capable of operating under software control to provide the encapsulated SIP message techniques described above.

It will be understood that each block, or step, or element of the control flow diagrams of FIGS. 4 and 5, and combinations of blocks and/or elements in the control flow diagrams, support combinations of means and combinations of steps for performing the specified functions. Similarly, it will be understood that each block, or step, or element of the control flow diagrams of FIGS. 4 and 5, and combinations of blocks and/or elements in the control flow diagrams can be implemented by computer program instructions. These computer program instructions may be loaded onto a computer(s) or other programmable apparatus to produce a machine, such that the instructions which execute on the computer(s) or other programmable apparatus create means for implementing the functions specified in the control flow diagram block(s) or element(s). These computer program instructions may also be stored in a computer-readable memory that can direct a computer or other programmable apparatus to function in a particular manner, such that the instructions stored in the computer-readable memory produce an article of manufacture including instruction means which implement the function specified in the control flow diagram block(s) or element(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the control flow diagram block(s) or element(s). It will also be understood that each block or element of the control flow diagrams, and combinations of blocks and/or elements in the control flow diagrams, can be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of performing encapsulation based SIP, comprising the steps of:
   binding an identification of an encapsulation protocol and an SIP identity for a recipient SIP client;
   creating or receiving an SIP message including an SIP identity;
   mapping the SIP message for the SIP identity of the SIP message based upon the SIP identity of the binding; and
   encapsulating the SIP message in the encapsulation protocol of the binding to produce an encapsulated SIP message.

2. The method of claim 1, wherein the step of binding is performed during an SIP registration phase of an SIP client with an SIP server.

3. The method of claim 1, further comprising the step of removing at least part of one encapsulated protocol header.

4. The method of claim 3, wherein at least the SIP client or SIP server is capable of interpreting and processing the IP packet of the SIP message in the encapsulation protocol of the binding without the at least one reduced protocol header by recognizing the encapsulation protocol and the availability of the SIP identity.

5. The method of claim 4, further comprising the steps of:
   determining reduced protocol headers; and
   bypassing processing of reduced protocol headers based upon identified, remaining headers.

6. The method of claim 1, wherein the step of encapsulating is performed between a network and an SIP client or between SIP clients.

7. The method of claim 6, wherein the network includes at least one of an SIP proxy server, an SIP redirect server, and an SIP registration server.

8. The method of claim 1, wherein the step of mapping is performed over the binding, and binding occurs in the encapsulation end points where encapsulation or decapsulation is performed.

9. The method of claim 1, further comprising the steps of:
   receiving said encapsulated SIP message; and
   decapsulating said encapsulated SIP message.

10. The method of claim 9, wherein the step of mapping maps the source of said encapsulated SIP message.

11. The method of claim 1, wherein the step of mapping maps the destination of said encapsulated SIP message, wherein said SIP message is received.

12. The method of claim 1, wherein said encapsulating uses a transfer protocol selected from the group of hypertext transfer protocol (HTTP) and a combination of hypertext transfer protocol (HTTP) and at least one of IP protocol, TCP protocol, and UDP protocol.

13. The method of claim 1, further comprising the step of determining that encapsulation is configured for the destination of said SIP message.

14. The method of claim 1, further comprising the step of removing the IP header from the SIP message.

15. A method of performing encapsulation based SIP, comprising the steps of:
   receiving an encapsulated SIP message;
   determining the encapsulation protocol of said encapsulated SIP message;
   binding an identification of the encapsulation protocol to the SIP identity of said SIP message; and
   decapsulating said encapsulated SIP message according to the encapsulation protocol.

16. The method of claim 15, further comprising the step of transmitting said decapsulated SIP message.

17. The method of claim 15, further comprising the step of mapping the source of said encapsulated SIP message for performing said step of decapsulating said encapsulated SIP message.

18. A system for establishing a Session Initiation Protocol (SIP) communication session with an encapsulated SIP message, comprising:
   an SIP message client; and
   an SIP server communicably connected to said SIP message client, wherein at least one of said SIP message client and said SIP server is configured to identify at least one common selected encapsulation protocol from a binding of an identification of at least one encapsulation protocol and an SIP identity for a recipient SIP client, wherein said at least one common selected encapsulation protocol corresponds to said identification of at least one encapsulation protocol, and wherein said SIP message client and said SIP server are both configured to encapsulate an SIP message according to the at least one common selected encapsulation protocol for communication of said SIP message or to decapsulate an encapsulated SIP message according to the at least one common selected encapsulation protocol for communication of said encapsulated SIP message.

19. The system of claim 18, wherein said SIP message client and said SIP server are separated by at least one of a firewall, a network address translator, and an application layer gateway.

20. The system of claim 19, wherein said SIP message client and said SIP server are separated across a public network.

21. The system of claim 20, wherein said SIP message client is a terminal located in a private network.

22. The system of claim 20, wherein said SIP message client is a mobile terminal located in a mobile network.

23. The system of claim 18, wherein said SIP message client is a mobile terminal.

24. The system of claim 18, wherein said SIP message client is adapted to receive and thereafter decode an encapsulated SIP message and said SIP server is adapted to encapsulate SIP message and thereafter send the encapsulated SIP message.

25. The system of claim 18, wherein said SIP server is adapted to receive and thereafter decode an encapsulated SIP message and said SIP message client is adapted to encapsulate an SIP message and thereafter send the encapsulated SIP message.

26. A terminal located within a network, the terminal comprising:
   a controller adapted to perform at least one of: (i) decapsulating an encapsulated SIP message, wherein the decapsulation is performed in accordance with an encapsulation protocol identified by a binding of an identification of the encapsulation protocol to an SIP identity of the encapsulated SIP message and (ii) encapsulating an SIP message, wherein the encapsulation of the SIP message is performed in accordance with an encapsulation protocol identified by a binding of an identification of the encapsulation protocol to an SIP identity for a recipient of the SIP message.

27. The terminal of claim 26, wherein said controller is further adapted to perform both: (i) decapsulating the encapsulated SIP message, wherein the decapsulation is performed in accordance with the encapsulation protocol identified by the binding of the identification of the encapsulation protocol to the SIP identity of the encapsulated SIP message and (ii) encapsulating the SIP message, wherein the encapsulation of the SIP message is performed in accordance with the encapsulation protocol identified by the binding of the identification of the encapsulation protocol to the SIP identity for the recipient of the SIP message.

28. An SIP server located within a network, said SIP server comprising:
   a controller adapted to perform at least one of: (i) decapsulating an encapsulated SIP message, wherein the decapsulation is performed in accordance with an encapsulation protocol identified by a binding of an identification of the encapsulation protocol to an SIP identity of the encapsulated SIP message and (ii) encapsulating an SIP message, wherein the encapsulation of the SIP message is performed in accordance with an encapsulation protocol identified by a binding of an identification of the encapsulation protocol to an SIP identity for a recipient of the SIP message.

29. The SIP server of claim 28, wherein said controller is further adapted to perform both: (i) decapsulating the encapsulated SIP message, wherein the decapsulation is performed in accordance with the encapsulation protocol identified by the binding of the identification of the encapsulation protocol to the SIP identity of the encapsulated SIP message and (ii) encapsulating the SIP message, wherein the encapsulation of the SIP message is performed in accordance with the encapsulation protocol identified by the binding of the identification of the encapsulation protocol to the SIP identity for the recipient of the SIP message.

30. The SIP server of claim 28, further comprising a table for mapping the source of an encapsulated SIP message.

31. A system for establishing a Session Initiation Protocol (SIP) communication session with an encapsulated SIP message, comprising:
   an SIP message client; and
   a network node communicably connected to said SIP message client, wherein at least one of said SIP message client and said network node is configured to identify at least one common selected encapsulation protocol from a binding of an identification of at least one encapsulation protocol and an SIP identity for a recipient SIP client, wherein said at least one common selected encapsulation protocol corresponds to said identification of at least one encapsulation protocol, wherein said SIP message client is configured to encapsulate an SIP message according to the at least one common selected encapsulation protocol for communication of said SIP message or to decapsulate an encapsulated SIP message according to the at least one common selected encapsulation protocol for communication of said encapsulated SIP message, and wherein the binding is configured between said SIP identity and the identification of the at least one common selected encapsulation protocol by at least one of said SIP message client and said network node.

32. The system of claim 31, wherein said SIP message client is preconfigured with an SIP identity.

33. The system of claim 31, wherein at least one of said SIP message client and said network node is adapted to remove at least part of a header to produce a reduced protocol header or to remove a header.

34. The system of claim 31, wherein said network node is configured to encapsulate an SIP message according to the at least one common selected encapsulation protocol for communication of said SIP message or to decapsulate an encapsulated SIP message according to the at least one common selected encapsulation protocol for communication of said encapsulated SIP message, and wherein the binding of said SIP identity and the at least one common selected encapsulation protocol is performed at said network node.

35. The system of claim 31, wherein said network node is an SIP server.

36. A computer program product comprising a computer-readable medium encoded with computer-executable program code stored therein for performing encapsulation based SIP, the computer-readable medium comprising:
- a first code adapted to bind an identification of an encapsulation protocol and an SIP identity for a recipient SIP client;
- a second code adapted to create or receive an SIP message including an SIP identity;
- a third code adapted to map the SIP message for the SIP identity of the SIP message based upon the SIP identity of the binding; and
- a fourth code adapted to encapsulate the SIP message in the encapsulation protocol of the binding to produce an encapsulated SIP message.

37. The computer program product of claim 36, wherein the first code is further adapted to be performed during an SIP registration phase of an SIP client with an SIP server.

38. The computer program product of claim 36, further comprising a fifth code adapted to remove at least part of one encapsulated protocol header.

39. The computer program product of claim 36, wherein the third code is further adapted to be performed over the binding, and the first code is further adapted to be performed in the encapsulation end points where encapsulation or decapsulation is performed.

40. The computer program product of claim 36, further comprising:
- a fifth code for receiving said encapsulated SIP message; and
- a sixth code for decapsulating said encapsulated SIP message.

41. The computer program product of claim 40, wherein the third code is further adapted to map the source of said encapsulated SIP message.

42. The computer program product of claim 36, wherein the third code is further adapted to map the destination of said encapsulated SIP message, wherein said SIP message is received.

43. The computer program product of claim 36, wherein the fourth code is further adapted to use a transfer protocol selected from the group of hypertext transfer protocol (HTTP) and a combination of hypertext transfer protocol (HTTP) and at least one of IP protocol, TCP protocol, and UDP protocol.

44. The computer program product of claim 36, further comprising a fifth code adapted to determine that encapsulation is configured for the destination of said SIP message.

45. The computer program product of claim 36, further comprising a fifth code adapted to remove the IP header from the SIP message.

46. A system for establishing a Session Initiation Protocol (SIP) communication session with an encapsulated SIP message, comprising:
- an SIP message client; and
- an SIP server communicably connected to the SIP message client, wherein at least one of the SIP message client and the SIP server comprises:
  - a means for binding an identification of an identified encapsulation protocol and an SIP identity for a recipient SIP client;
  - a means for creating or receiving an SIP message including an SIP identity;
  - a means for mapping the SIP message for the SIP identity of the SIP message based upon the SIP identity of the binding; and
  - a means for encapsulating the SIP message in the identified encapsulation protocol of the binding to produce an encapsulated SIP message;
- wherein the SIP message client and the SIP server are both configured to encapsulate or decapsulate an SIP message or encapsulated SIP message according to at least one common selected encapsulation protocol for communication of the SIP message or encapsulated SIP message, wherein the at least one common selected encapsulation protocol includes the identified encapsulation protocol.

47. The system of claim 46, wherein the means for binding an identification of an identified encapsulation protocol and an SIP identity for a recipient SIP client is adapted to perform the binding during an SIP registration phase of an SIP client with an SIP server.

48. The system of claim 46, wherein the SIP message client and the SIP server further comprises a means for removing at least part of one encapsulated protocol header.

49. The system of claim 46, wherein the a means for mapping the SIP message for the SIP identity of the SIP message based upon the SIP identity of the binding is adapted to map over the binding, and the means for binding an identification of an identified encapsulation protocol and an SIP identity for a recipient SIP client is adapted to bind in the encapsulation end points where encapsulation or decapsulation is performed.

50. The system of claim 46, wherein the SIP message client and the SIP server further comprises:
- a means for receiving said encapsulated SIP message; and
- a means decapsulating said encapsulated SIP message.

51. The system of claim 50, wherein the a means for mapping the SIP message for the SIP identity of the SIP message based upon the SIP identity of the binding is adapted to map the source of said encapsulated SIP message.

52. The system of claim 46, wherein the a means for mapping the SIP message for the SIP identity of the SIP message based upon the SIP identity of the binding is adapted to map the destination of said encapsulated SIP message, wherein said SIP message is received.

53. The system of claim 46, wherein the means for encapsulating the SIP message in the identified encapsulation protocol of the binding to produce an encapsulated SIP message is adapted to use a transfer protocol selected from the group of hypertext transfer protocol (HTTP) and a combination of hypertext transfer protocol (HTTP) and at least one of IP protocol, TCP protocol, and UDP protocol.

54. The system of claim 46, wherein the SIP message client and the SIP server further comprises a means for determining that encapsulation is configured for the destination of said SIP message.

55. The system of claim 46, wherein the SIP message client and the SIP server further comprises a means for removing the IP header from the SIP message.

* * * * *